(12) United States Patent  (10) Patent No.: US 9,350,567 B2
Dinger et al.  (45) Date of Patent: May 24, 2016

(54) NETWORK RESOURCE CONFIGURATIONS

(75) Inventors: John E. Dinger, Durham, NC (US);
Matthew E. Duggan, London (GB);
Daniel J. Martin, New York, NY (US)

(73) Assignee: International Business Machines Corporation, Armonk, NY (US)

(*) Notice: Subject to any disclaimer, the term of this patent is extended or adjusted under 35 U.S.C. 154(b) by 955 days.

(21) Appl. No.: 13/358,167

(22) Filed: Jan. 25, 2012

(65) Prior Publication Data

US 2012/0290715 A1  Nov. 15, 2012

(30) Foreign Application Priority Data

Jan. 25, 2011  (EP) .................................... 11152049

(51) Int. Cl.
*G06F 15/173*  (2006.01)
*H04L 12/64*  (2006.01)
(52) U.S. Cl.
CPC .................. *H04L 12/6418* (2013.01)
(58) Field of Classification Search
CPC ................................................. H04L 12/6418
See application file for complete search history.

(56) References Cited

U.S. PATENT DOCUMENTS

| 7,974,219 B2 | 7/2011 | Strahan et al. | |
| 2006/0020570 A1* | 1/2006 | Wu | 707/1 |
| 2006/0294066 A1* | 12/2006 | Dettinger et al. | 707/3 |
| 2007/0100892 A1* | 5/2007 | Kephart et al. | 707/200 |
| 2010/0080129 A1 | 4/2010 | Strahan et al. | |

OTHER PUBLICATIONS

Hasan, "An Active Temporal Model for Network Management Databases," Proceedings of the IFIP/IEEE Fourth International Symposium on Integrated Network Management, May 1995, pp. 524-535.

* cited by examiner

*Primary Examiner* — June Sison
*Assistant Examiner* — Steven Nguyen
(74) *Attorney, Agent, or Firm* — Yee & Associates, P.C.; Joseph Petrokaitis

(57) ABSTRACT

Temporally classifying and visually representing network and IT infrastructure with planned or occurred configuration activities and/or policy compliance or non-compliance of network and IT resources, including a method, apparatus and computer program for gathering and classifying observable configuration aspects of resources and relationships in a network of resources, wherein the method comprises: analyzing the network of resources to collect planned configuration times and actual resource status; monitoring actual resource status to make determinations if planned configurations are executed; and updating a network configuration status with the determinations. Planned and actual configurations are collected and monitored over a defined time range extending before and/or after a time zero. Each planned or actual configuration is categorized with respect to one or more time windows in the defined time range.

35 Claims, 9 Drawing Sheets

NETWORK RESOURCE CONFIGURATIONS

BACKGROUND

1. Field

This invention relates to a method and apparatus for managing network and information technology (IT) resource configurations. In particular, this relates to a method and apparatus for temporally classifying and visually representing network and IT infrastructure with planned or occurred configuration activities to check for policy compliance.

2. Description of the Related Art

Deployment of network and IT resources typically requires: deployment; configuration; ongoing maintenance; and determination as to whether such resources meet operational and regulatory requirements (i.e. policy compliance checks). The requirements are often expressed as policies against known aspects of the resources. Such network and IT resources include but are not limited to: routers; switches; printers; hosts; firewalls; servers; operating systems; software applications and virtual machines.

In such deployments, resource management software applications are used to manage hardware and software assets in a number of inter-related areas including but not limited to: fault management; performance management; configuration management; business service management; and security management.

Fault management typically focuses on managing the operational state of a given resource such that, in the event of a fault, operators can quickly determine the cause, symptoms and activities required to rectify a fault. For instance, a network port failure would typically result in a number of alarms being presented to the operator who then may schedule expedient work to move services from the failed port on to a spare port on the same device.

Performance management typically focuses on managing the historical, current or predicted ability of a resource to perform its role for a number of consumers. Operators typically make use of charts and graphs to view metrics such as network port throughput or computer processing unit (CPU) utilization and frequently combine related metrics into dashboards. Operators typically also wish to generate 'problem' or 'resolution' alarms in the event of a specific metric exceeding or falling below a particular threshold, such as if CPU utilization reaches a threshold of 90% utilization.

Configuration management focuses on managing the configuration artifacts associated with deployed hardware and software resources in the network or IT environment. Activities typically include, but are not limited to, making bulk configuration changes to large numbers of devices, such as: changing a network password; making granular changes such as part of targeted service provisioning activities; deploying software patches; and rolling back to a previously known good configuration. Configuration management operators frequently exploit fault and performance data in conjunction with resource configuration data to understand how a resource is currently configured, the potential impact of configuration changes in the environment and policy compliance of a specific configuration. Related to configuration management is policy management with respect to whether the network or IT environment adheres to a previously defined set of requirements expressed as policies, such as to ensure that encrypted passwords are used or that routing protocol configuration meets best practices.

Business service management focuses on managing a set of hardware and software network and IT resources with a view to understanding whether a specific business service is deployed and operating as expected. This discipline typically does not require the low level detail required in the previous three disciplines as it typically provides a higher-level view of the service landscape than that of, say, fault management. For instance, business service managers typically ask questions such as 'Are my services operating effectively?' and 'Are my customers getting the quality of service they are paying for?'.

Security management focuses on managing security-related aspects of resources in the managed environment and is closely related to the other disciplines, especially configuration and fault management. This discipline typically covers areas such as ensuring that the appropriate user accounts and role/group memberships have been configured but also heavily comes into fault management given that security is an artifact of configuration. For example, a configuration compliance policy relating to an Access Control List (ACL) on a network router is a security-centric policy.

To manage these inter-related areas, the following common provisions are needed in any resource management software used:

1. Provision for discovery and construction of a model of the resources and relationships deployed in the environment to be managed.
2. Provision of a mechanism for collecting event and alarm information, either solicited or unsolicited, and associating such events and alarms with the constructed model.
3. Provision of a mechanism for interacting with resources in the managed environment, such as to retrieve or apply configuration artifacts on-demand
4. Provision of a mechanism for visualizing and reporting on a variety of known characteristics about the managed environment including topological, but not limited to, displays, service models, alarm lists, charts and graphs and textual reports.
5. Provision of a mechanism for creating and managing 'trouble tickets' corresponding to artifacts from each management discipline. For instance, in the event of a network port failure, the operator would typically raise a trouble ticket to track progress with the problem in conjunction with the customer using the port. Similarly, if planned maintenance work is required, the operator typically raises a ticket to schedule and track the planned maintenance ahead-of-time whilst notifying users dependent on the resource to be maintained.
6. Provision of a mechanism for determining whether known characteristics about the managed environment are deemed to be operationally and regulatory policy compliant or non-compliant based on some set of defined characteristics. For instance, 'Are all of my machines running the correct operating system version?', 'Are all of my sessions adhering to configuration best practices?', 'Am I seeing any of my devices being configured by operators without the appropriate level of permissions?'.

The areas described above typically work together to provide effective control over the managed environment. However, the size and complexity of today's modern network and IT infrastructure and number of human operators required poses challenges for operators with respect to gaining concise, accurate and timely information about recent or planned configuration activities, changes and policy compliance. This is particularly important in network and IT management as understanding whether recent configuration-related activities adversely affect a business service in conjunction with other management disciplines (such as fault, security and performance) can significantly expedite the resolution of faults in the environment. Similarly, understanding the resources and relationships that can be affected by planned configuration activities and when is vitally important in effectively managing the network or IT resources.

Typically, operators exploit static reports and alarm lists to understand a variety of configuration-related characteristics in the managed environment, for instance:
1. Tabular reports can provide insight into the configuration activities within a specified timeframe, either historical or planned, when wishing to understand what resources have been/will be changed and by whom.
2. 'Real time' dashboards can provide an at-a-glance view of the currently configured state with respect to policy compliance across the managed environment, typically via a single score and graph of that score over-time.
3. Alarm/event lists can support the above characteristics by associating events/alarms with either current state or historical state, for instance, a configuration change may have resulted in a specific network port being administratively shut-down, in which case, an alarm will typically be raised that can be associated with the configuration change and associated trouble-ticket.

US patent publication 2010/0080129 'Network troubleshooting using path topology' looks at some of the problems described. It discloses, in a networking environment, a method for categorizing resources, analyzing for time-related data, monitoring and comparing time-related data with a time checkpoint. The system includes a network node manager and health report generator. The network node manager generates and displays a path topology. The health report generator is coupled to the network node manager and receives identities of each of the network elements, determines summary information for each of the network elements, and displays the summary performance information.

However, the above approach has a markedly different focus given that it is predominantly fault oriented, exploits the inherently ordered nature of a path through a network topology and does not consider recent or planned configuration activities or policy compliance/violation with respect to historical or planned temporal classification, that is, 'time windows' based on an observable configuration-related property of a network or IT resource or relationship, such as a network model property or event received by, for instance, the management or trouble ticketing systems relating to a configuration activity or policy compliance/violation for a given resource, relationship or set thereof. Resources are related to one another, and whilst prior art configuration management systems provide a means to view configuration artifact activity over-time, they do not look for configuration or policy compliance/violation artifact characteristics in historical and future contexts.

SUMMARY

In a first aspect of the invention, there is provided a method for gathering and classifying observable configuration aspects of resources and relationships in a network of resources, wherein the method comprises: analyzing the network of resources to collect planned configuration times and actual resource status; monitoring actual resource status to make determinations if planned configurations are executed; and updating a network configuration status with the determinations.

The present invention provides a mechanism to provide operators with at-a-glance topologically-aware visibility of configuration or policy compliance/violation artifacts in either historical and/or future-facing temporal windows. Furthermore, the present invention provides a mechanism through which such temporal classifications are said to be a component of the network or IT resource and relationship model, and can thus be exploited by consumers of the network or IT resource and relationship model.

The collecting, monitoring and determining step require the implementing application to observe different systems or data to drive appropriate temporal classification, for instance, recent changes may be observable directly from the resources in the environment, whereas planned changes for the same resource and topic may require observation of a configuration management system containing planning data.

The present invention allows flexibility in the configuration management so that a sub-set of resources can be analyzed to filter on what is required by the user as defined by space and/or by time periods and/or by configuration category. An example of filtering by space is to use the topology of the network. Examples of filtering by time periods are to filter configurations by the: next 5 minutes; last 15 minutes; next 1 hour; or last 1 day after the recent or planned configuration activity accordingly. An example of filtering by configuration category can be filtering by a general configuration change or by a special configuration. Furthermore, determining whether a selected set of resources has been configured and acquiring the configuration details for an associated set of resources saves time and processing capacity over performing such determinations over all the resources for all time.

Advantageously, one or more physical groups of resources in the work are analyzed. This allows an economical use of processing capacity in a management system monitoring millions of events over long periods of time. More advantageously, one or more types of configuration and corresponding actual resource status are collected and monitored. In the description, the types of configuration are identified by the artifact subject type. This allows an economical use of processing capacity in a management system monitoring millions of events over long periods of time and allows the present invention to focus on an area of interest to the user. An example of type of configuration or 'topic' of classification is "Changes to Router Configuration".

Suitably further comprising collecting and monitoring planned and actual configurations over a defined time range extending before and/or after a time zero. More suitably further comprising categorizing each planned or actual configuration with respect to one or more time windows in the defined time range. If configuration is yet to occur, categorizing using the configuration planned time and wherein if the configuration has occurred then categorizing using the configuration actual time.

Time windows are temporal classifications in relation to a configuration or configuration type. The temporal classification can be historical or future/planned and the 'size' of the time window can vary depending on the configuration aspect. For instance, the "Changes to Router Configuration" topic may be configured with two temporal classifications—"last hour" and "next hour" which can be considered as subsets of the topic. Then, when the configuration aspect of the topic is observed, a determination is made as to whether or not the resource is considered to belong to the "next hour" or "last hour" temporal classification of the topic.

Even more suitably, further comprising rendering planned configurations and actual configurations together in the same context in shared graphical space. An important aspect of this feature of the embodiment is a graphical infrastructure for depicting the resources in a topological view, temporal classification view and 'artifact subject' or topic view.

Preferably further comprising calculating policy compliance using the network configuration status.

More preferably further comprising: determining the resources in the network or IT environment; determining relationships between resources in the network or IT environment; and determining resource groups from the relationships.

An important aspect of this feature of the embodiment is a model of the resources in the managed environment and, where applicable, how they're related to one another.

Advantageously the monitoring of a resource, to determine if it has been configured, is only performed close to or after the planned configuration. Prudent use of monitoring resources improves overall performance of the network management system.

More advantageously further comprising categorizing each configuration according to a planned schema if the configuration has not been executed and a historic schema if the configuration has occurred.

In a second aspect of the invention there is provided a system as described in claim 11.

In a third aspect of the invention there is provided a computer program product as described in claim 21.

In a fourth aspect of the invention there is provided a computer program as described in claim 31.

In a fifth aspect of the invention there is provided a method and technique of visually depicting historical or planned configuration changes and/or policy compliance/non-compliance for a set of potentially topologically related resources in a managed network and/or IT environment such that an operator can determine the resources subject to change or policy compliance/violation, topological relationships where applicable and the 'temporal distance' (either historical or future) from 'now', for example, the point at which the operator observes the data.

In a sixth aspect of the invention there is provided a method and technique of categorizing configuration changes and/or policy compliance/violation by configurable time-windows based on a common notion of subject or topic for a given set of resources, all resources subject to an network password change, or all resources violating a specific policy.

In a seventh aspect of the invention there is provided a method and technique of viewing the resources that may have been affected by a detrimental configuration change and/or policy compliance violation in a managed network and/or IT environment based on temporal categorization of configuration change and policy non-compliance indicators with respect to a common notion of subject or topic, for example, all resources subject to a specific errant configuration activity.

In an eighth aspect of the invention there is provided a method and technique of modeling the configuration change activities and policy compliance/non-compliance via sets of resources that are temporally related to a configuration change activity or policy compliance/violation with respect to their historical or future temporal categorization against the configuration change activity.

In a ninth aspect of the invention there is provided a method and technique of programmatically updating data sets such that a given configuration change or policy compliance/non-compliance has resources temporally associated with it based on whether or not the configuration activity or policy compliance/violation is considered to have happened to the set of associated resources in the past or will happen in the future based on a set of configurable time windows that represent when the activity shall or has occurred.

In a tenth aspect of the invention there is provided a method and technique of allowing operators to determine the resources and relationships that are subject to pending configuration change activities or policy compliance/non-compliance before they occur and to obtain prior visual notification of a configuration activity taking place by viewing sets of resources under the activity, such as an network password change, move from pending through to occurred via manipulation of set membership where each set represents a future or historical time window with respect to the configuration activity.

In an eleventh aspect of the invention there is provided a method and technique by which operators can view planned or unplanned configuration changes occur as a function of set-based management application visualization capabilities.

In a twelfth aspect of the invention there is provided a method and technique of allowing operators to view resource state information pertaining to a planned (future) or historical configuration change or policy compliance/violation taking into account 'temporal distance' and classification against a specific configuration activity or policy compliance/violation.

In a thirteenth aspect of the invention there is provided a method and technique of allowing operators to view which unmanaged resources, such as those owned by a peer network, may be affected by a configuration change or policy compliance/violation by virtue of a.) a discovery system within the management application having discovered and inferred them, and b.) their topological relationship to a managed resource that is a member of a given artifact subject and time window.

In a fourteenth aspect of the invention there is provided a method for gathering and classifying data associated with a network (comprising at least one resource), wherein the method comprises: analyzing a resource to determine a membership category; analyzing the resource to determine time-related data; monitoring the resource to compare the time-related data with a time checkpoint; updating the time-related data in response to determining that the time checkpoint has been reached; and updating the time-related data of a further resource having the same membership category.

In a fifteenth aspect of the invention there is provided an apparatus for gathering and classifying data associated with a network resource, wherein the apparatus comprises: a database to store which resources belong to an artifact subject; the same database to store, on an artifact-subject basis, which resources belong in which time window; a mechanism to drive time-window membership on a per-resource per-artifact subject basis; and a visualization mechanism to view the artifact-subject and time-window resource membership.

BRIEF DESCRIPTION OF THE SEVERAL VIEWS OF THE DRAWINGS

A preferred embodiment of the invention will now be described, by means of example only, with reference to the accompanying drawings in which.

DETAILED DESCRIPTION

The preferred embodiment of the invention is a resource management software application that runs on a network device in a network of connected network devices. The resource management software application, when loaded onto the device and executed, controls a platform and enables commutation between the platform and the connected devices.

Figure 1:
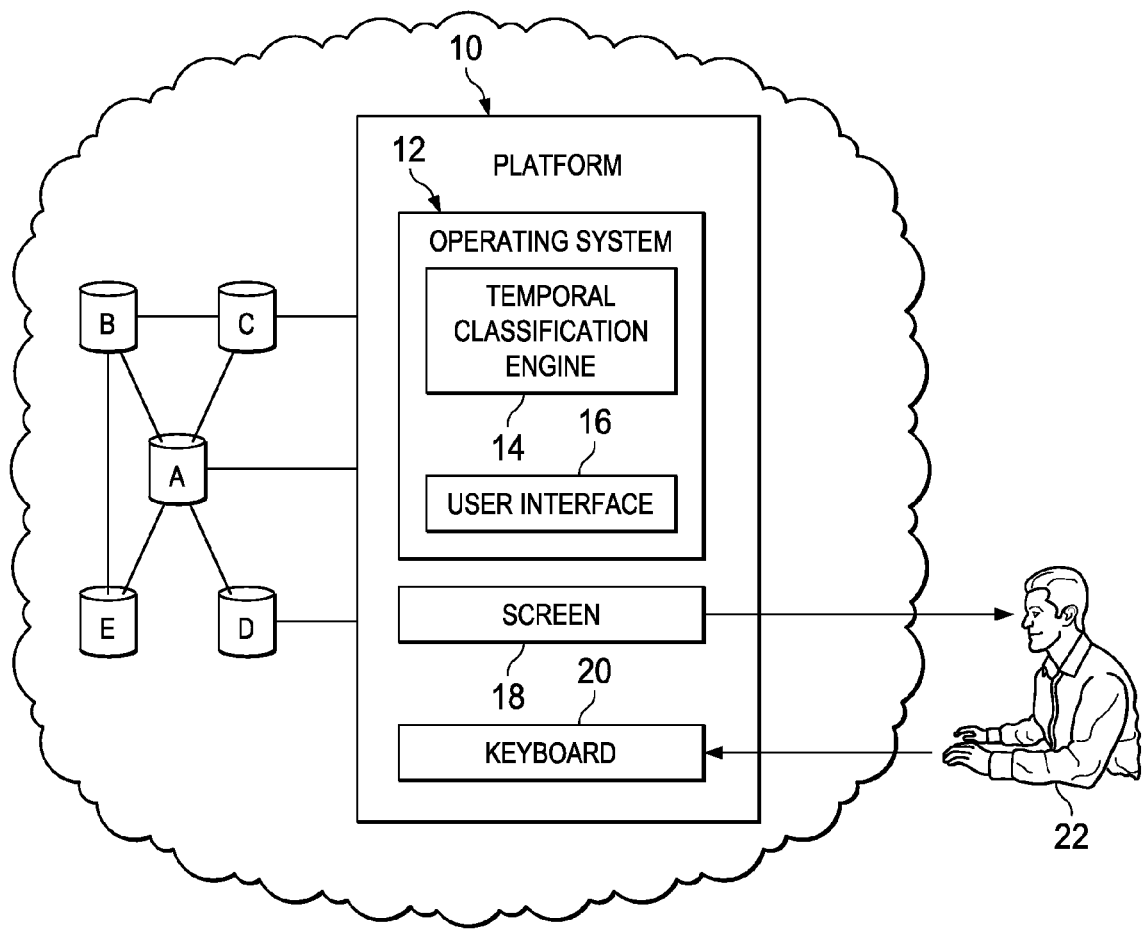
FIG. 1 is a deployment diagram of the preferred embodiment.

The deployment diagram of FIG. 1 shows connected network devices A, B, C, D, E and platform 10. Platform 10 is a computing platform for executing the software application of the preferred embodiment. Platform 10 comprises: a processor; memory; hard drive; network interfaces; data bus; video screen 18; and keyboard 20 for running an application execution environment. When operational, operating system 12 and temporal classification engine 14 are loaded into platform memory and are executed by the platform processor using the interfaces to communicate with network devices. Temporal classification engine 14 uses operating system user interface 16 to provide output on screen 18 and input through keyboard 20. User 22 is able to view output from the platform on the video screen 18 and enter input to the platform on the keyboard 20.

Platform 10 is not directly connected to all devices in a network but by means of communications protocols can communicate with devices indirectly through an intermediate device. In FIG. 1, platform 10 is shown connected to A, C and D but only one physical connection is needed for communication with all devices.

Figure 2:
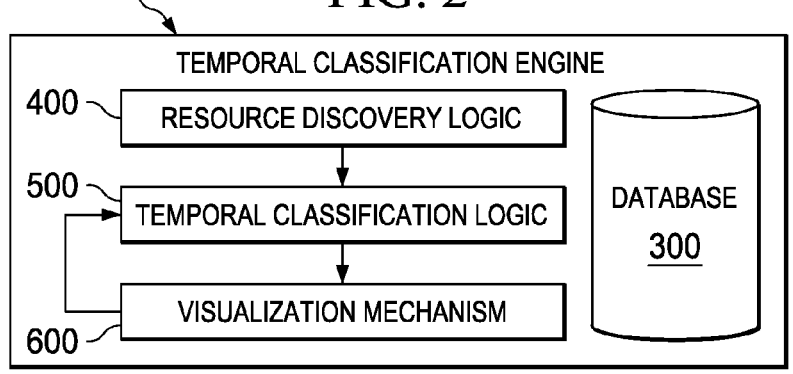
FIG. 2 is a component diagram of the preferred embodiment.

Referring to FIG. 2, temporal classification engine 14 comprises database 300; resource discovery logic 400; temporal classification logic 500; and visualization mechanism 600.

Database 300 is for storing data objects used by the temporal classification engine 14 and is described in more detail below with reference to FIG. 3.

Resource discovery logic 400 is for determining what resources and relationships exist in the network or IT environment. The results of the determination are stored in database 300 so that they may be acted on by the temporal classification logic 500 and the visualization mechanism 600. Resource discovery logic 400 is described in more detail below with reference to FIG. 4.

Temporal classification logic 500 is for determining the topic and temporal classification membership of the resources or relationships from the data stored in database 300 and from querying resources directly. The status information is stored in database 300 so that it may be acted on by the visualization mechanism 600. Temporal classification logic 500 is described in more detail below with reference to FIG. 5.

Visualization mechanism 600 is for graphical rendering of configuration status through a user interface and onto a video screen. Visualization mechanism 600 operates independently and at the same time as temporal classification logic 500 and is described in more detail below with reference to FIG. 6.

Figure 3:
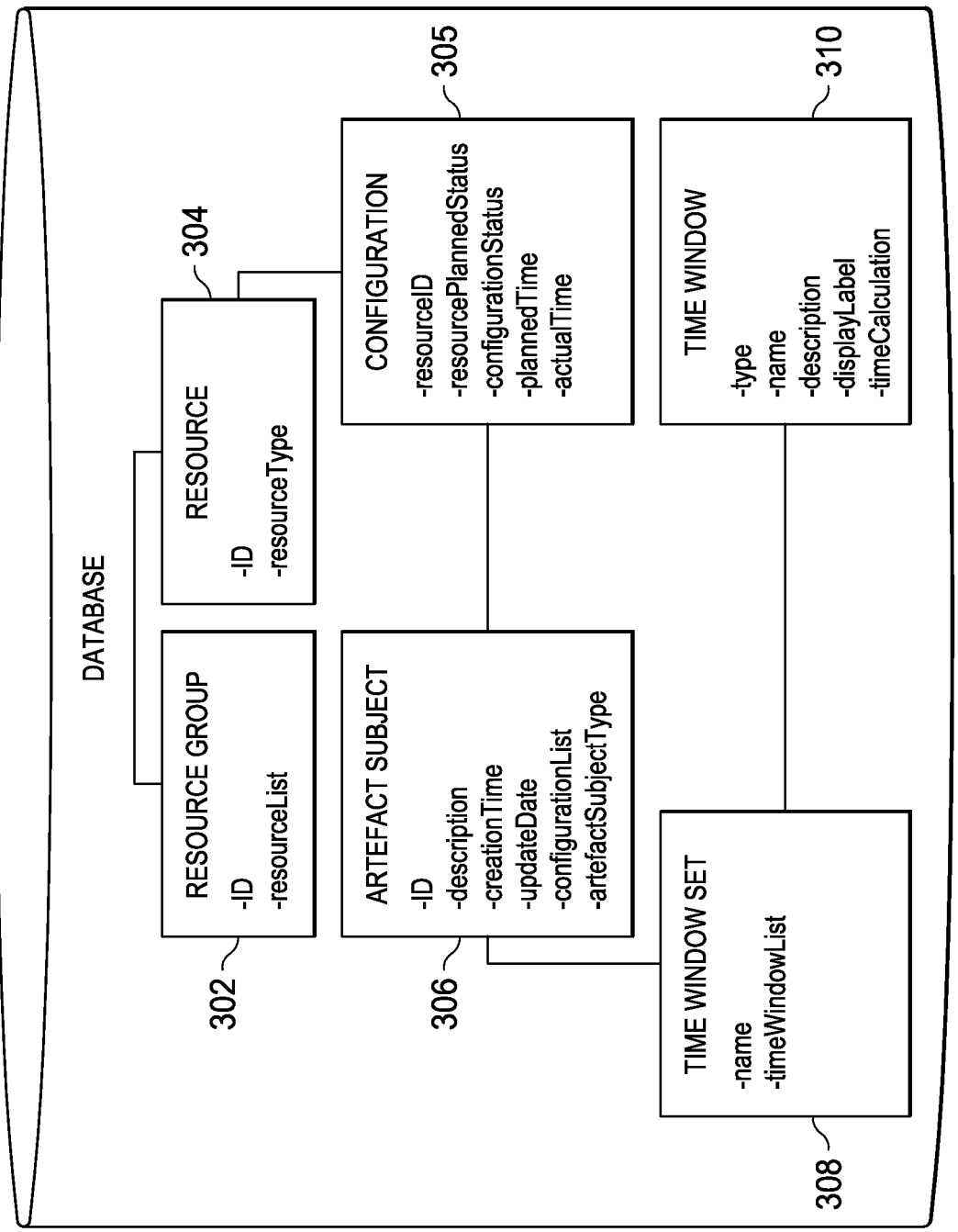
FIG. 3 is a schematic class diagram of the data of preferred embodiment.

Referring to FIG. 3, database 300 stores data objects of the following data classes: resource group class 302; resource class 304; configuration class 305; artifact subject class 306; time window set class 308; and time window class 310. Database 300 is for storing information about which resources or relationships belong to an artifact subject; and on an artifact-subject basis, which resources belong in which time window.

Resource group class 302 defines a number of resource group objects each representing a group of resources in the network. Each resource group object is associated to one or more resource objects. A resource group object has the following attributes: ID and resourceList. Attribute resourceList is for listing all the resource objects in the resource group. A resource may be in one or more resource groups.

Resource class 304 defines one or more resource objects each representing a resource in the network. A resource has the following attributes: ID and resourceType. Different types of resource are expected and stored as in the resourceType attribute, for example resource type may be a router or a port in a router. One or more resources are expected to be represented by respective resource objects and a resource may belong to one or more resource groups.

Configuration class 305 defines one or more configuration objects representing a planned configuration and/or an actual configuration of a resource. Configuration class 305 comprises the following attributes: resourceID for identifying the corresponding resource; resourcePlannedStatus for storing the expected status for testing if the resource has been configured; configurationStatus for recording that the configuration has been executed; plannedTime for time when a configuration is planned to occur; and actualTime for storing the time when the configuration occur. Zero or more configuration objects may be created for each resource object.

Artifact subject class 306 defines a number of artifact subject objects and an artifact subject object represents one or more configurations performed on a resource. The artifact subject class has the following attributes: ID; description; creationTime; completionTime; configurationList; and artifactSubjectType. An artifact subject object can be a specific type, of which there may be many. Attribute configurationList is a reference list of all the configuration objects that comprise the artifact subject. Attribute creationTime is the time that the artifact subject was created. Attribute completionTime is the time that all the configurations in the ConfigurationList have been executed. Each artifact object is associated with a time window set object.

Time window set class 308 defines a number of sets of time windows. For example, the preferred embodiment is described in terms of a set of Time Windows ranging from −1 week to +1 week with multiple time windows ranging in this period. Another Time Window set could represent the period −1 year to +1 year. A time window set object has the following attributes: name and timeWindowList. The timeWindowList attribute references each time window object that is part of the time window set.

Time window class 310 defines a number of time window objects each representing a particular time period from a time zero point. Each time window object collects resources by virtue of its associated artifact subject 306 and configurations 305. Each resource has an observable configuration/policy-related characteristic as determined by the artifact subject, such as "Port Configuration Changes". Time window objects have the following attributes: ID; name; description; dispayLabel; type; and timeCalculation. The attribute type determines whether the time window is historical or future/planned for ease of querying. The attribute timeCalculation represents the actual time period for the window, for instance, zero to 15 minutes or 15 minutes to 1 hour. It may be expressed as a mathematical formula, such as 60*60 (seconds in one hour, 3600) or as an absolute value expressed in an appropriate measure such as, but not limited to, microseconds, seconds, minutes etc. The displayLabel attribute contains text for display in the graphical interface.

Resource discovery logic 400 discovers the network resources and relationships needed by the status determining logic 500 and populates resource group objects and resource objects in database 300. Resource discovery logic 400 executes before status determining logic 500 is executed.

Figure 4:
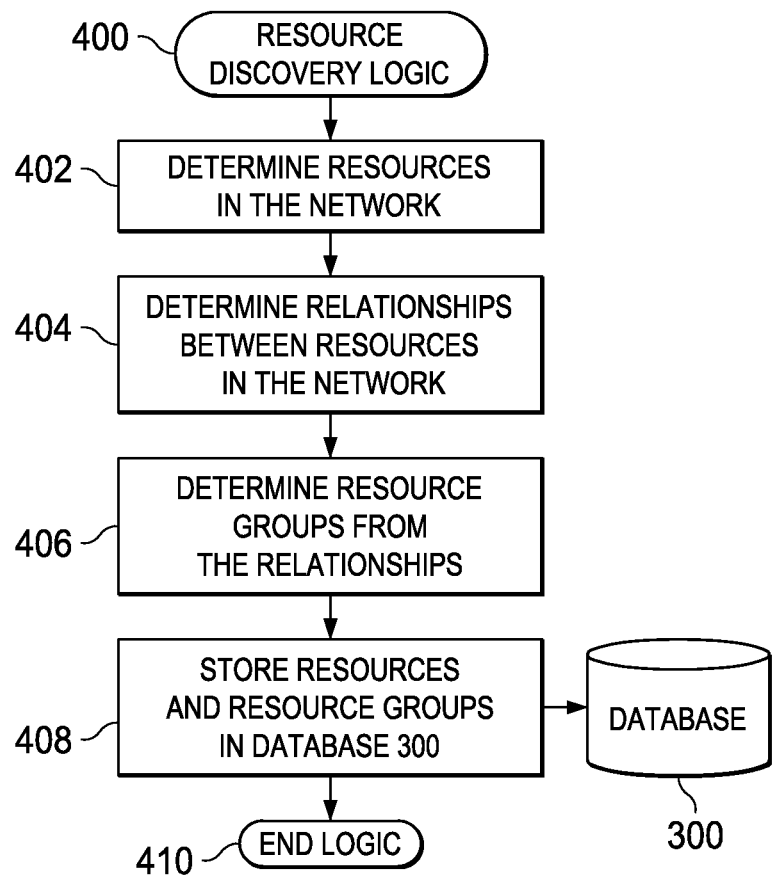
FIG. 4 is a process diagram of resource discovery logic of the preferred embodiment.

Referring to FIG. 4, there is described resource discovery logic 400. Resource discovery logic 400 comprises logical process steps 402 to 410.

Step 402 is for determining resources in the network and populating the resource class 304 with as many resource objects as is discovered. Discovery take takes the form of interrogation of internal or external network discovery engine and/or direct communication of resources.

Step 404 is for determining relationships between resources in the network by interrogating a network discovery engine and/or by interrogating the resources directly.

Step 406 is for determining the resource groups from the determined relationships and for populating resource groups class 302 to created resource group objects. In the preferred embodiment each resource group references the resources in that group.

Step 408 is for finalizing the objects and storing them in database 300.

Step 410 is the end of the resource discovery logic.

After resource discovery logic 400 has discovered the network resources, status determining logic 500 is executed.

Figure 5:
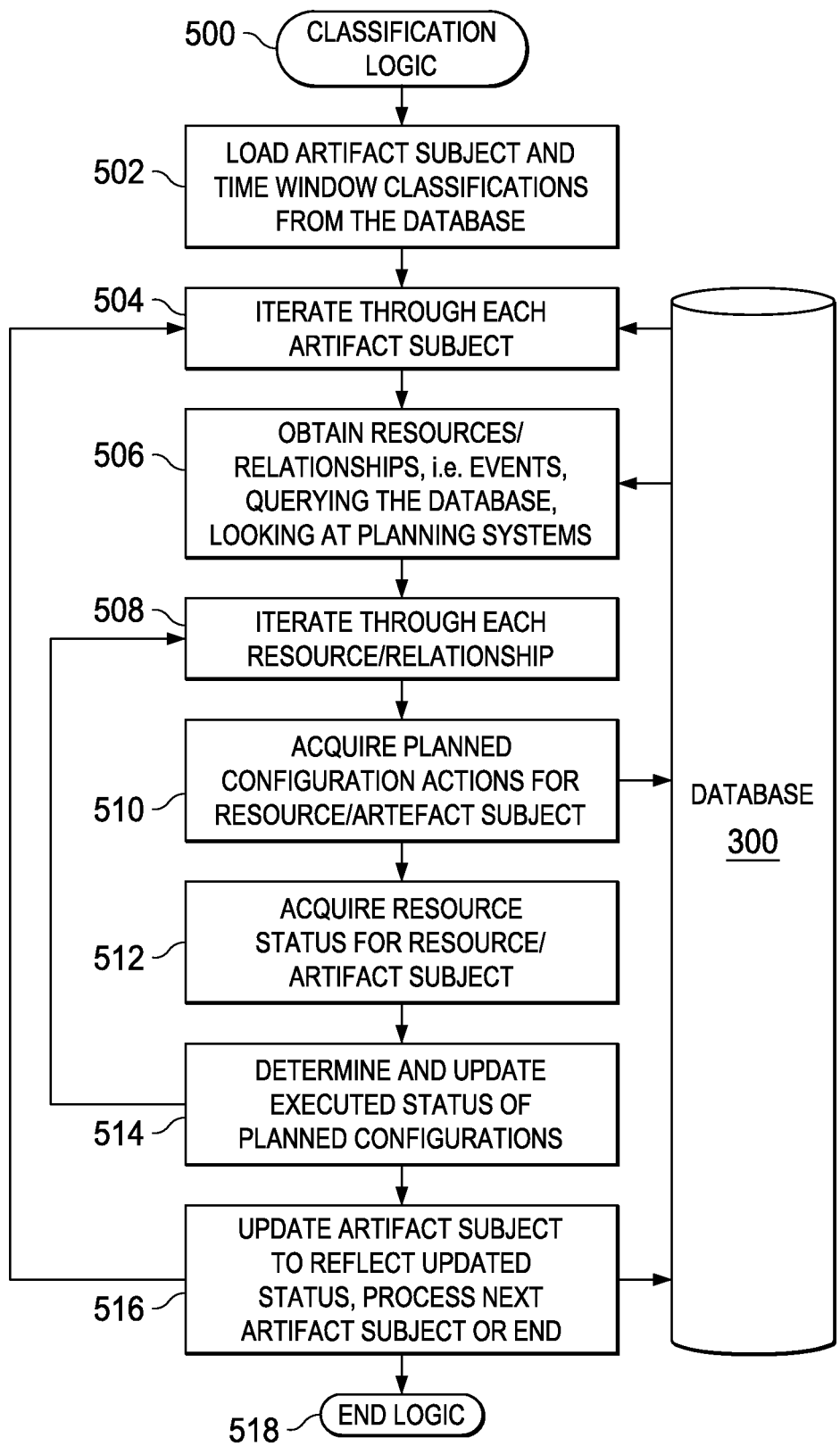
FIG. 5 is a process diagram of temporal classification logic of the preferred embodiment.

Referring to FIG. 5, there is described status determining logic 500 comprising logical process steps 502 to 510.

Step 502 is for loading artifact subject and time window classification from database 300.

Step 504 is for iterating through each artifact subject.

Step 506 is for obtaining resources and relationships from database 300. For instance, this may mean updating the searching performed by the resource discovery logic.

Step 508 is for iterating through each resource and relationship.

Step 510 is for collecting configuration data relating to present resource and relationships. The data is collected from database 300 and from the resources and relationships directly Step 512 is for acquiring resource status for each resource with respect to the artifact subject.

Step 514 is for determining, for each planned configuration for the resource, if the configuration has been executed. This step is performed for each planned configuration. Although the configuration may occur before the planned time in the preferred embodiment, the determining is performed after the planned configuration time to save on processing capacity. The respective configuration object is updated to show that the configuration has been executed so that determining if the execution is no longer performed and determining configuration time can be performed. The process iterates with next resource at step 508 or, if there are no more resources, then the process continues at step 516.

Step 516 is for updating the artifact subject to reflect the updated status. If all the configurations for the artifact subject have been executed then the artifact subject is completed. The next artifact subject is processed at step 504. If there are no further artifact subjects then the process continues at step 518.

Step 518 is the end of the logical process.

During the processing of the status determining logic 500, visualization mechanism 600 is executing and categorizing each configuration according to two schemas: a) the planned configuration time date if the configuration has not been executed or b) the actual configuration time date if the configuration has occurred.

Figure 6:
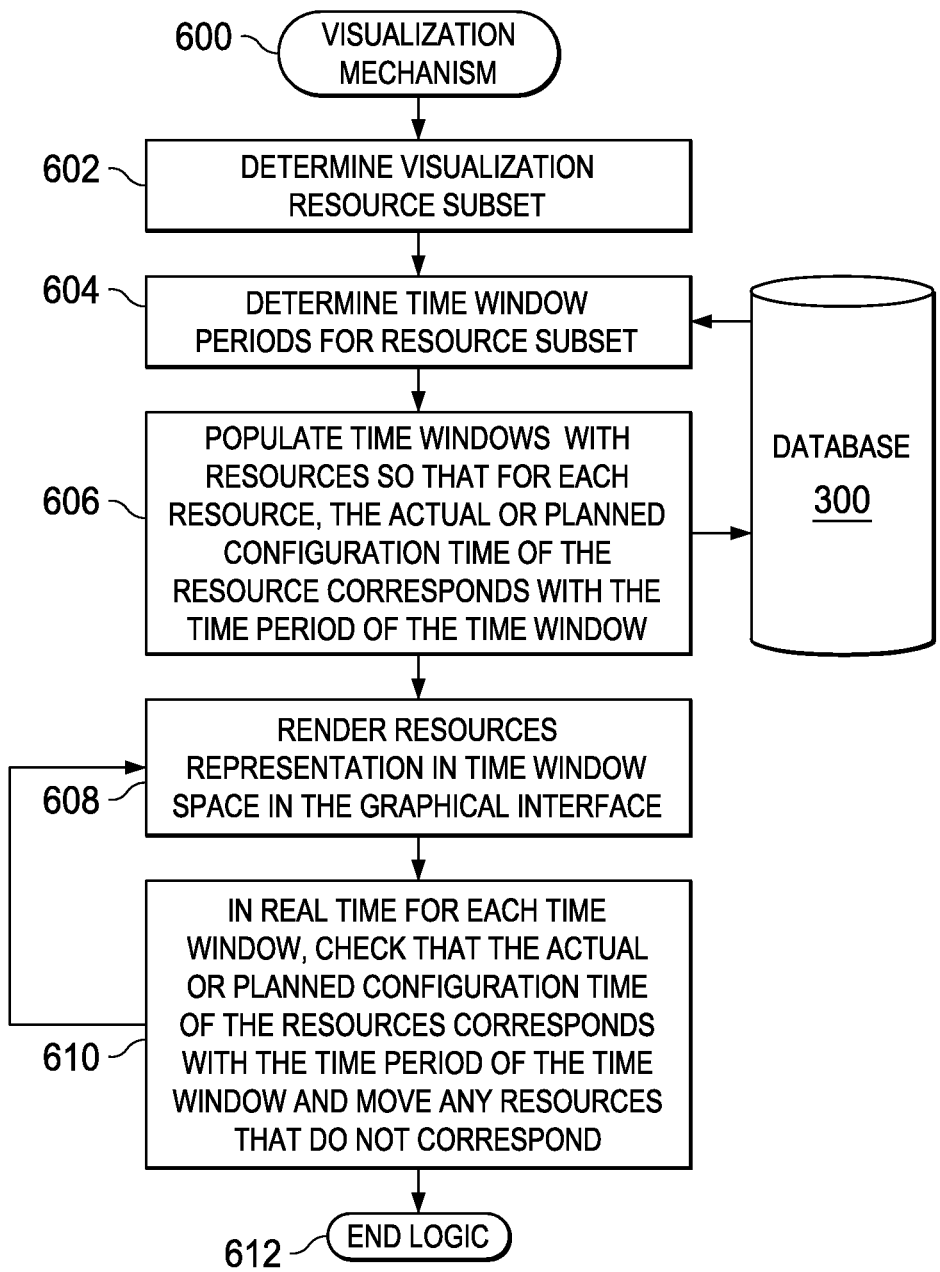
FIG. 6 is a process diagram of the visualization mechanism of the preferred embodiment.

Referring to FIG. 6, there is shown a process diagram of the visualization mechanism 600 comprising logical process steps 602 to 612. What happens in each step depends on the type of configuration and the following should be considered an example. In this case artifact subject refers generally to all recent configuration changes.

Step 602 is for determining a visualization subset, by a user selecting a group of resources and one or more subject artifact through a navigation menu according to physical resources groups and type of configuration.

Figure 7:
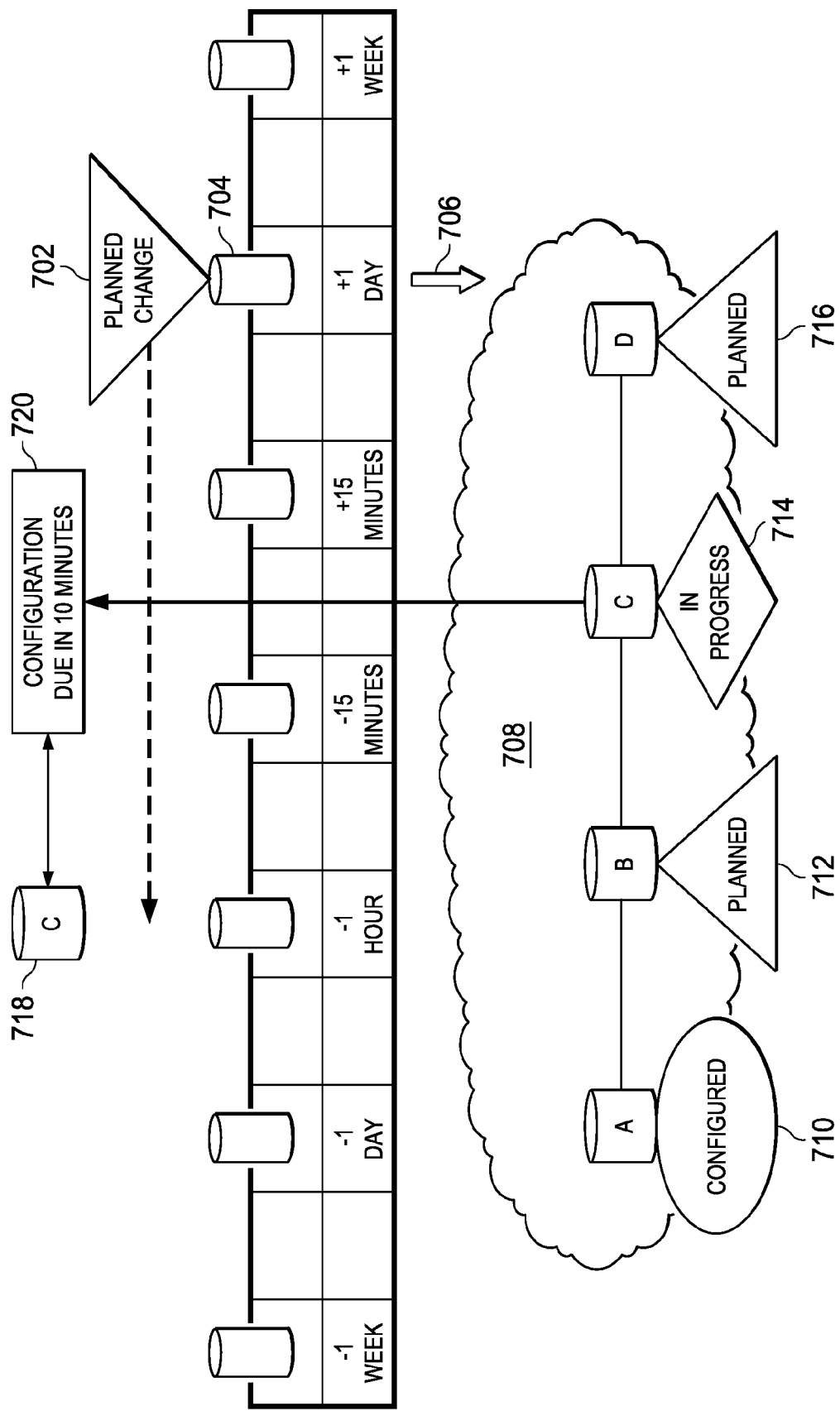
FIG. 7 is an example configuration visualization of the preferred embodiment.

Step 604 is for determining the time window periods for the resource set. In the preferred embodiment, time window sets are associated to artifact subjects. FIG. 7 shows an example time window set for a particular artifact subject comprising time window periods between −1 week and −1 day; −1 day and −1 hour; −1 hour and −15 minutes; −15 minutes and zero; zero and +15 minutes; +15 minutes and +1 hour; +1 hour and +1 day; and +1 day and +1 week.

Step 606 is for populating the time windows. For each resource in the set of resources, the actual or planned configuration time of the resource is used to populate a corresponding time window. So, for example, at 15:00 hours on 20 July a resource with a planned configuration 20:17 20 July would be placed in +1 hour to +1 day time window.

Step 608 is for rendering graphical representations of the resources in time window space in a graphical user interface. In a simple embodiment, a table or bar chart algorithm could be used with the list of time windows and corresponding recourses. In the preferred embodiment a time line rendering algorithm is used. A graphical representation of the resource together with a label and hyperlink are rendered in a graphical window in the user interface.

Step 610 is for keeping the time windows updated with the actual and planned configuration times. In real time and for each time window, the actual or planned configuration times of the resources are checked so that they correspond with the time period of the time window. Any resource that does not correspond is moved to a time window period that that does correspond. The visualization process loops between the graphical rendering step 608 and the time window updating step 610 until the visualization is no longer needed.

Step 612 is the end of the visualization logic 600.

EXAMPLES

Referring to FIG. 7, consider a scenario whereby 100 devices (cloud 708) are going to be subject to a configuration change to a scheduled update of their network passwords in two days time (see inverted triangle "Planned Change" icon 702 above the "+1 Day" bucket icon 704). The planned change icon 702 represents the status of the artifact subject as it moves along the time line as represented by the dashed arrow. A resources marker 706 associates a time window previously with the set of 100 devices represented by the cloud of four devices 708. Icon 702 gets nearer to time zero as time progresses. Then, as the configuration changes are applied, the user can see icon 702 move away into the historical time until eventually disappearing from the set of views once over 1 week old. The shape of icon 702 will change from an inverted triangle to a diamond representing "in progress" status at certain threshold of "in progress" resource configurations. At some further point, icon 702 will change to an oval representing that a threshold number of resources has been configured, thereby upholding an example configuration policy.

Marker 706 shows the association between the time bucket +1 day and the set of devices 708. The timeline as shown in FIG. 7 shows configuration changes and policy compliance/violation activities considered to belong to a 'temporal bucket' or 'time window' as a function of the topic or subject of the configuration-related artifact. It can be observed that as time progresses relative to the observation time, a set of resources related to a specific configuration artifact subject can be considered to 'move' from either 'now' (point of observation) into the past and/or from the future (planned) through now and into the past. The user would see the marker 706 move from the +1 day bucket to the +1 hour time box when the planned configuration time dropped to 1 hour or less in the future. Shapes 710 to 716 represent the configuration status of the artifact subject for each resource. Oval 710 represents the configure status of the adjacent resource. Triangles 712 and 716 represent the planned status of configuration for each of the individual adjacent resources. Diamond 714 represents a resource in which configuration is in progress. An option in the preferred embodiment is for showing the progress details of the configuration change 714 in expanded detail by further status icons (for example 718 and 720). The position of the status icons 710 to 712 is random in this example but is within the scope of the present embodiment for the status of the resources to be aligned to a time bucket just as artifact subject status icon 702 is.

Figure 8:
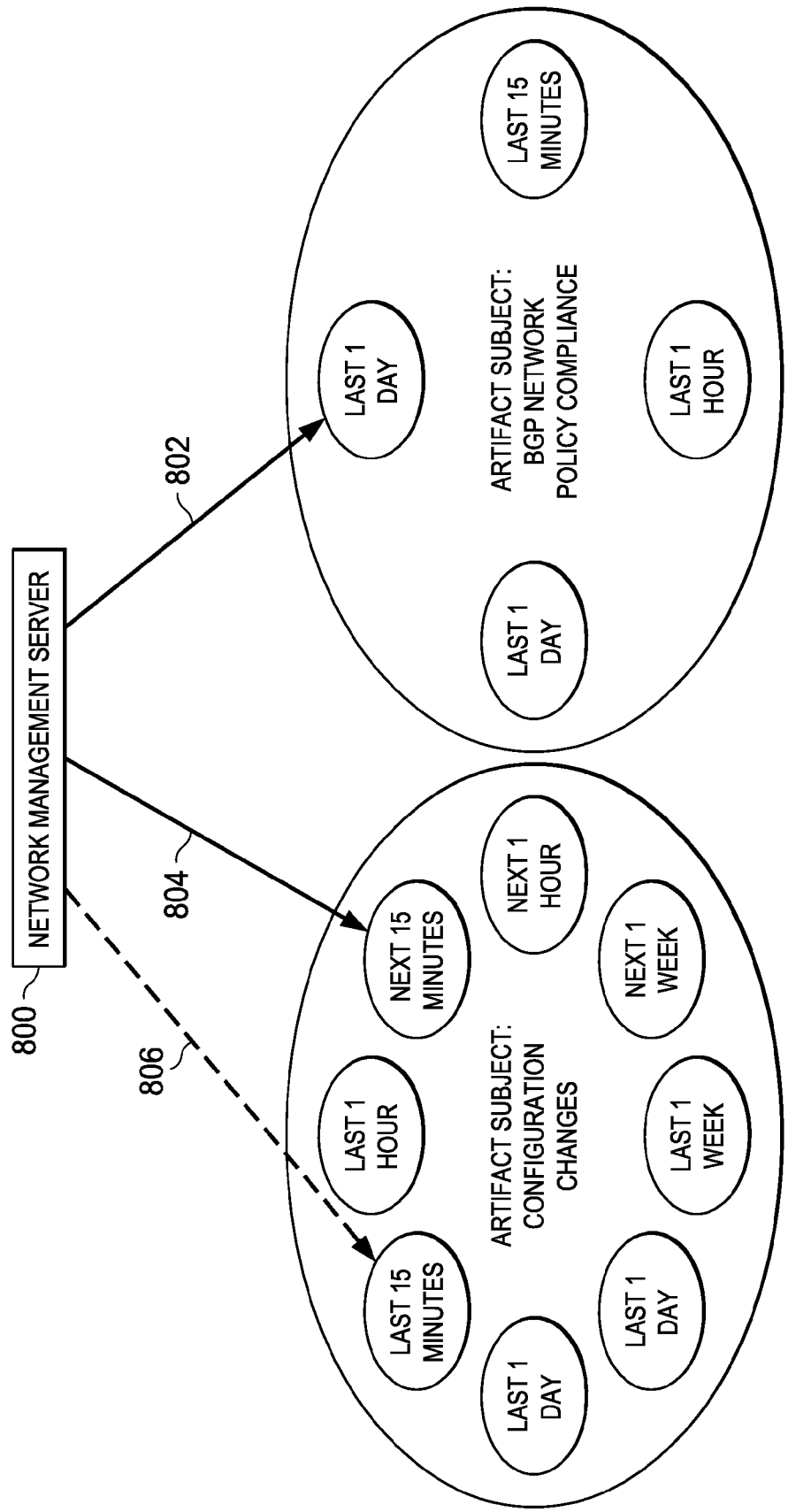
FIG. 8 is another example configuration visualization of the preferred embodiment.

FIG. 8 is another example visualization that shows how a given resource 800, in this case a server in a network management role, for example, a Border Gateway Protocol (BGP) route collector, can be associated with many artifact subjects and that each artifact subject can have different sets of time windows. A Border Gateway Protocol (BGP) route collector is a device that collects information about a route using the protocol backing the core routing decisions on the Internet.

Arrow 802 depicts that the server became BGP network policy-compliant within the last day. Arrow 804 depicts that a configuration change will occur in the next 15 minutes (for example pre-planned). Dashed line 806 depicts that once the configuration change has occurred, the server will become a member of the 'Last 15 Minutes' time window in a Configuration Changes artifact subject.

Figure 9:
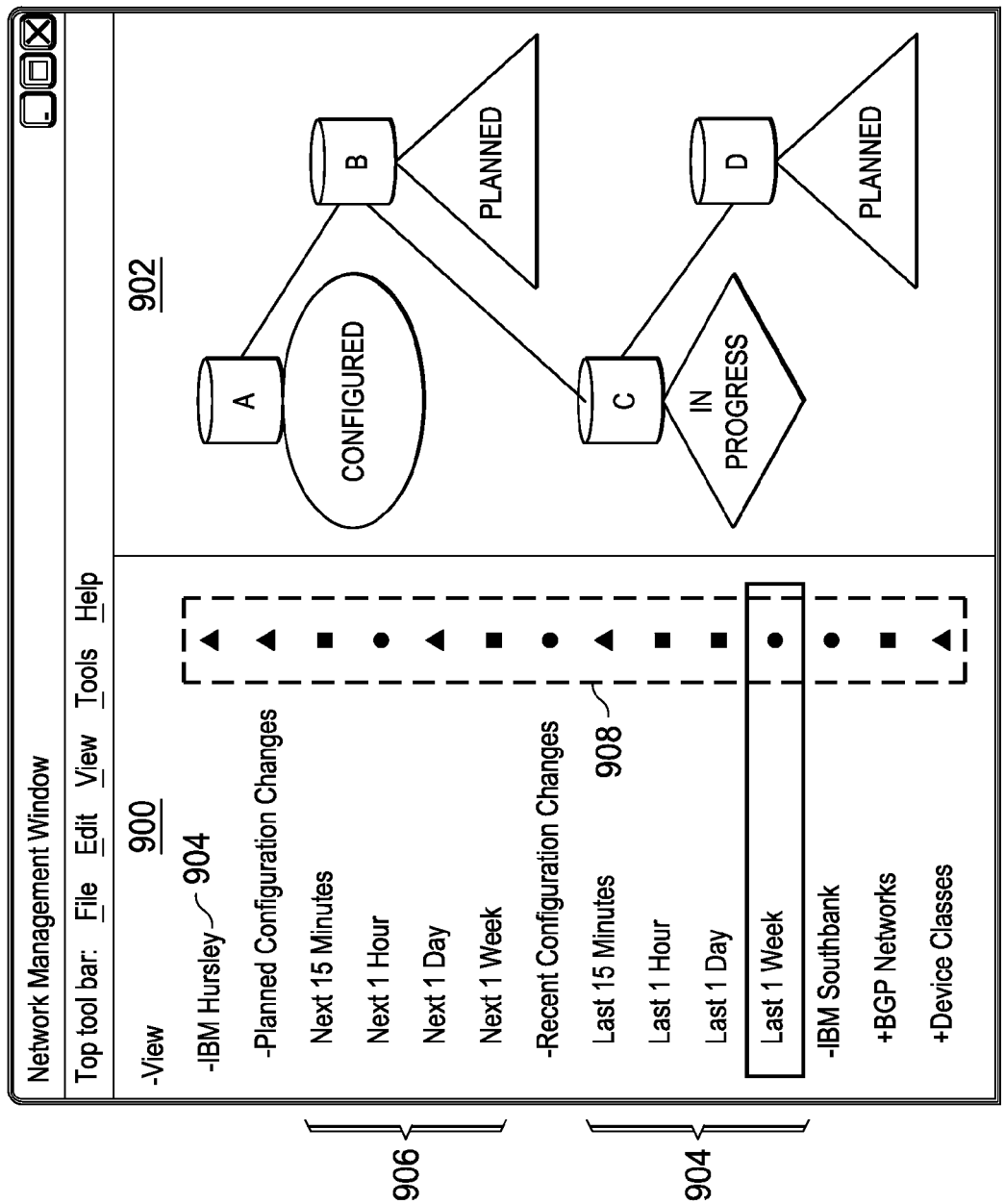
FIGS. 9 and 10 are example screenshots of another configuration visualization of the preferred embodiment.

FIG. 9 is an example screenshot of a two window pane resource explorer type configuration resource interface. A navigation window pane 900 and a main window pane 902 show at-a-glance pending and historical changes based on specific configuration activities and/or policies in a consistent way using the preferred or other embodiments. The two pane layout is conducive to depicting how topologically related resources are subject to pending or historical configuration changes, such as when an entire network is modified. The example illustrates how a navigation pane tree-view is used such that operators can drill-into specific resources 904 and their associated time windows 906. In the navigation pane adjacent each node of the navigation tree are shown configuration status icons 908 for the node time window nodes, the planned and recent configuration nodes, and the resource nodes. Each configuration status icon can represent a summary status for the aggregated individual configurations or a particular configuration policy. The status of a time window represents the status of the aggregated configurations in that time window. A planned configuration status icon represents an aggregation of the status for all the time windows that have planned configuration status. The status of the resources is a policy or aggregation using all planned and recent configurations. The main panel shows resource membership and/or artifact subjects depending on which node in the tree the user has selected.

If the user selects a specific time window like 'Last 1 Week' in FIG. 9, the main window pane shows the resources associated with that time window. For instance, the 'Last 1 Week' time window has been selected for the 'Recent Configuration Changes' artifact subject. The main panel then shows all of the resources, in this case network devices, that have been changed within the last 1 week. Topological relationships can be shown between resources. Current resource-states can also be shown in the display.

Figure 10:
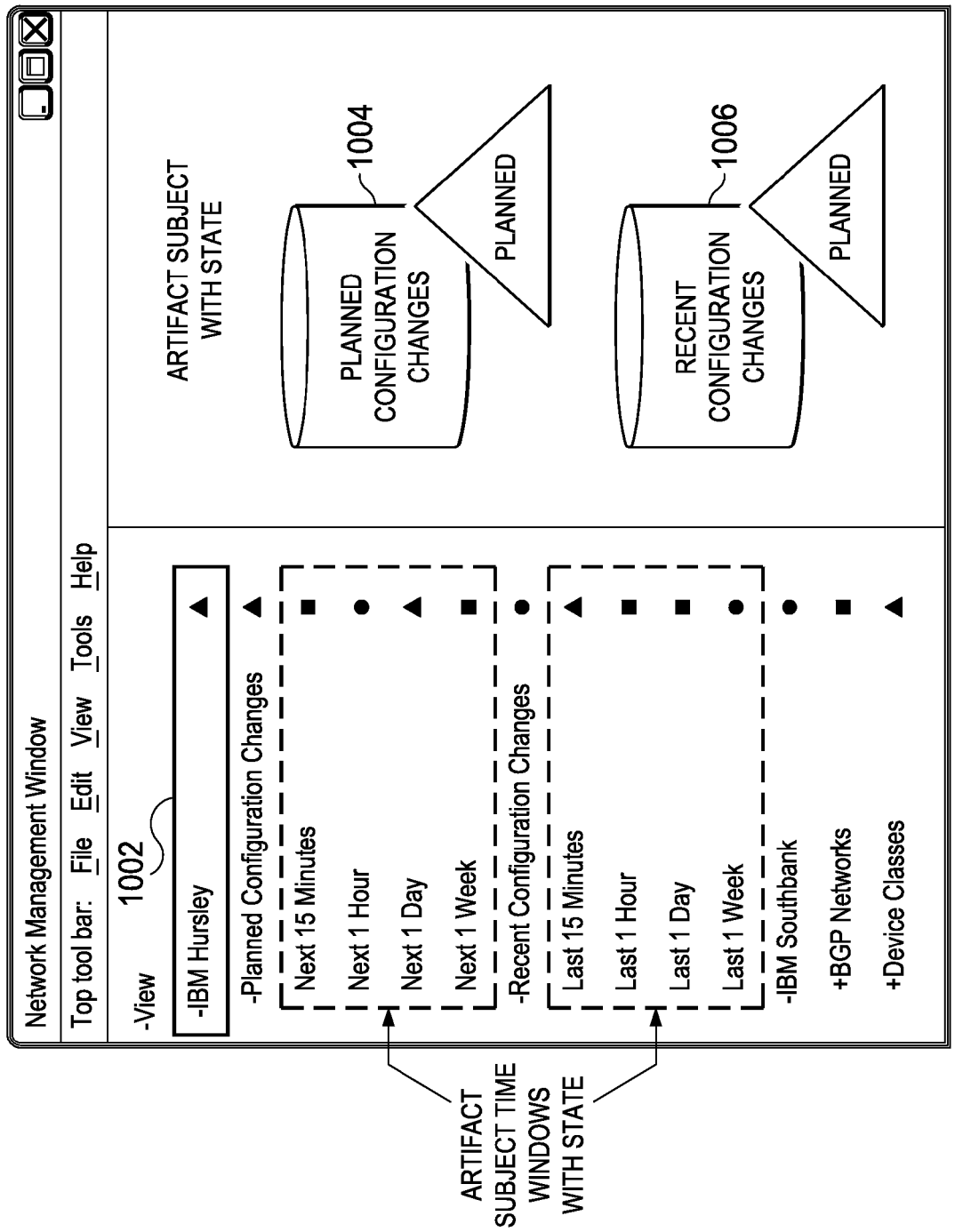

Example screenshot FIG. 10 shows that a resource 1002 is selected in the navigation window and two icons representing artifact subjects displayed in the main window. The artifacts subjects represent planned configuration changes 1004 and recent configuration changes 1006. State is applied to the artifact subjects based on the highest (for example, most severe) state of a resource within the related time windows, that is the state propagates from resource to time window to artifact subject. In this example, at least one resource having a planned configuration change has a severe status represented by the triangle icon and this status propagates to the icon representing the planned configuration change. Similarly, the 'Recent Configuration Changes' artifact subject represents that there is a resource with a severe state (triangle icon in this example) in the 'Last 1 Week' time window.

By using the status configuration and visualization mechanism of the present embodiment, a user is able to view a specific artifact subject, a historical and/or future time window and the resources held therein in a consistent way whilst being able to exploit any capability the management application already offers. For instance, using the preferred embodiment, the user can prepare for changes planned in the next 15 minutes and ascertain the related resources to be affected by the change. A user can view changes that have happened to related resources within the last 1 hour and that may have had a detrimental affect on the services provided by the managed environment. Similarly, a user may elect to view non-topological depictions, such as a table, of resources within a given time-window if the number of resources is large.

Further contemplated embodiments of the invention are now described.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

In summary, this specification relates to a method and apparatus for temporally classifying and visually representing network and IT infrastructure with planned or occurred configuration activities and/or policy compliance or non-compliance of network and IT resources. There is described a method, apparatus and computer program for gathering and classifying observable configuration aspects of resources and relationships in network of resources, wherein the method comprises: analyzing the network of resources to collect planned configuration times and actual resource status; monitoring actual resource status to make determinations if planned configurations are executed; and updating a network configuration status with the determinations. Planned and actual configurations are collected and monitored over a defined time range extending before and/or after a time zero. Each planned or actual configuration is categorized with respect to one or more time windows in the defined time range.

What is claimed is:

1. A method for gathering and classifying observable configuration aspects of resources and relationships in a network of resources, wherein the method comprises:
   analyzing, by a computing device, the network of resources to collect planned configuration times and actual resource status;
   monitoring, by the computing device, the actual resource status to make configuration determinations if planned configurations to any of the resources are executed;
   collecting and monitoring, by the computing device, planned and actual configurations to the resources over a defined time range extending before and after a checkpoint time;
   updating a network configuration status with the configuration determinations; and
   rendering the network configuration status, the planned configurations and the actual configurations together in a same context in shared graphical space of a graphical user interface.

2. The method of claim 1 wherein one or more physical groups of resources in the network of resources are analyzed.

3. The method of claim 1 wherein one or more types of configuration and corresponding actual resource status are collected, monitored and rendered in the shared graphical space of the graphical user interface.

4. The method of claim 1 wherein monitoring the actual resource status is only performed during the defined time range.

5. The method of claim 1 further comprising categorizing each planned and actual configuration with respect to one or more time windows in the defined time range.

6. The method of claim 5 wherein each planned configuration is categorized and rendered according to a planned schema and each actual configuration is categorized and rendered according to a historic schema.

7. The method of claim 1 further comprising calculating policy compliance using the network configuration status.

8. The method of claim 1 further comprising:
   determining the resources in the network or IT environment;
   determining relationships between the resources in the network or IT environment; and
   determining resource groups from the relationships.

9. The method of claim 1 wherein monitoring the actual resource status is only performed close to or after the planned configuration.

10. The method of claim 1 further comprising categorizing each configuration according to (i) a planned schema if the configuration has not been executed and (ii) a historic schema if the configuration has occurred.

11. A system for gathering and classifying observable configuration aspects of resources and relationships in a network of resources, wherein the system comprises a data processor coupled to a memory comprising instructions that are operable by the data processor to perform steps of:
   analyzing the network of resources to collect planned configuration times and actual resource status;
   monitoring the actual resource status to make configuration determinations if planned configurations to any of the resources are executed;

collecting and monitoring, by the computing device, planned and actual configurations to the resources over a defined time range extending before and after a checkpoint time;

updating a network configuration status with the configuration determinations; and rendering the network configuration status, the planned configurations and the actual configurations together in a same context in shared graphical space of a graphical user interface.

12. The system of claim 11 wherein one or more physical groups of resources in the network of resources are analyzed.

13. The system of claim 11 wherein one or more types of configuration and corresponding actual resource status are collected, monitored and rendered in the shared graphical space of the graphical user interface.

14. The system of claim 11 wherein monitoring the actual resource status is only performed during the defined time range.

15. The system of claim 11 further comprising categorizing each planned and actual configuration with respect to one or more time windows in the defined time range.

16. The system of claim 15 wherein each planned configuration is categorized and rendered according to a planned schema and each actual configuration is categorized and rendered according to a historic schema.

17. The system of claim 11 further comprising calculating policy compliance using the network configuration status.

18. The system of claim 11 further comprising:
determining the resources in the network or IT environment;
determining relationships between the resources in the network or IT environment; and
determining resource groups from the relationships.

19. The system of claim 11 wherein monitoring the actual resource status is only performed close to or after the planned configuration.

20. The system of claim 11 further comprising categorizing each configuration according to (i) a planned schema if the configuration has not been executed and (ii) a historic schema if the configuration has occurred.

21. A computer program product comprising a non-transitory computer readable recording medium having computer readable code stored thereon for gathering and classifying observable configuration aspects of resources and relationships in a network of resources, the computer readable code which when loaded onto a computer system and executed performs the following steps:

analyzing the network of resources to collect planned configuration times and actual resource status;

monitoring the actual resource status to make configuration determinations if planned configurations to any of the resources are executed;

collecting and monitoring, by the computing device, planned and actual configurations to the resources over a defined time range extending before and after a checkpoint time;

updating a network configuration status with the configuration determinations; and rendering the network configuration status, the planned configurations and the actual configurations together in a same context in shared graphical space of a graphical user interface.

22. The computer program product of claim 21 wherein one or more physical groups of resources in the network of resources is analyzed.

23. The computer program product of claim 21 wherein only one or more types of configuration and corresponding actual resource status are collected, monitored and rendered in the shared graphical space of the graphical user interface.

24. The computer program product of claim 21 wherein monitoring the actual resource status is only performed during the defined time range.

25. The computer program product of claim 21 further comprising categorizing each planned and actual configuration with respect to one or more time windows in the defined time range.

26. The computer program product of claim 25 wherein each planned configuration is categorized and rendered according to a planned schema and each actual configuration is categorized and rendered according to a historic schema.

27. The computer program product of claim 21 further comprising calculating policy compliance using the network configuration status.

28. The computer program product of claim 21 further comprising:
determining the resources in the network or IT environment;
determining relationships between the resources in the network or IT environment; and
determining resource groups from the relationships.

29. The computer program product of claim 21 wherein monitoring the actual resource status is only performed close to or after the planned configuration.

30. The computer program product of claim 21 further comprising categorizing each configuration according to (i) a planned schema if the configuration has not been executed and (ii) a historic schema if the configuration has occurred.

31. A computer program, stored on a non-transitory computer readable storage medium and loadable into an internal memory of a digital computer, comprising software code portions for performing the method of claim 1 when said computer program is run on the digital computer.

32. The method of claim 1 wherein the rendering step further comprises:
rendering the defined time range in the shared graphical space of the graphical user interface.

33. The method of claim 32 wherein the rendered network configuration status depicts recent configuration activities and associated policy compliance activities.

34. The method of claim 32 wherein the rendered planned configurations depict first policy compliance activities associated with the planned configurations.

35. The method of claim 34 wherein the rendered actual configurations depict second policy compliance activities associated with the actual configurations.

* * * * *